United States Patent Office 3,468,825
Patented Sept. 23, 1969

3,468,825
PROPIONALDOXIME ANTISKINNING AGENT FOR USE WITH OXIDIZING RESINS
Lowell D. Pals, Terre Haute, Ind., assignor to Commercial Solvents Corporation, New York, N.Y., a corporation of Maryland
No Drawing. Filed Sept. 28, 1964, Ser. No. 399,813
Int. Cl. C08g 51/60; C08k 1/40
U.S. Cl. 260—22        6 Claims This invention relates to antiskinning agents for use with oxidizable resins and, more particularly, to the use of propionaldoxime as an antiskinning agent for inhibiting the formation of skin on alkyd resin compositions.

In surface coatings which dry by oxidation, including varnishes, alkyd resins, etc., a problem is presented by the tendency for a solidified film or skin to form on the surface of the packaged material during storage and particularly in an opened container. This problem is referred to as "skinning." "Antiskinning" agents are materials which inhibit the formation of such films without materially increasing the drying time of the product. One type of anti-skinning agent used heretofore, for example, has consisted of solvents which apparently inhibit the formation of a skin through their ability to act as dispersants for polymers. Recently, the prevention of skin formation using certain antioxidants, e.g. methylethylketoxime, and phenols such as octylphenol and 2,6-di-tert-butyl-4-methylphenol, has been investigated.

According to the present invention, it has been found that propionaldoxime is effective as an anti-skinning agent for resins which dry by oxidation, e.g. alkyd resins, especially oil-modified alkyd resins and compositions such as varnishes, paints, etc., containing the same. Propionaldoxime is an easily handled liquid with a very mild and rather pleasant odor as compared to other oximes and can be easily produced by the direct reduction of 1-nitropropane making its use attractive.

The anti-skinning agent of the present invention, i.e. propionaldoxime, effectively protects oxidizable resins, e.g. alkyd resins as a class against skinning. Alkyd resins are complex polyesters produced by the esterification of a polyhydric alcohol with a polybasic organic acid. Any desired polyfunctional alcohol can be used, illustrative examples being tris(hydroxymethyl)aminomethane, glycerol, ethylene glycol, polyglycerol, pentaerythritol, mannitol, sorbitol, propylene glycol, etc. The polybasic organic acid can, for example, be a dicarboxylic acid such as for example, phthalic, maleic or fumaric acids or a tribasic acid such as trimellitic acid. To produce tough flexible polymers suitable for protective coatings, the resin is usually "oil-modified," i.e. a certain proportion of the glycerol hydroxyl groups is esterified with fatty acids. In the production of paints, etc., alkyd resins modified by higher molecular weight unsaturated faty acids, e.g. containing about 10 or more, e.g. up to about 25, carbon atoms, advantageously 16 to 20 carbon atoms, or with drying oils, are preferred. Oil modification is, in effect, a means of controlling the functionality of the glycerol or other polyhydric alcohol by tying up hydroxyls with a monobasic group incapable of further esterification.

The most common examples of alkyd resins are the commercially available glycerol-phthalic anhydride polyesters that have been modified with an unsaturated fatty acid composition (or its glyceride) such as linseed oil, soybean oil, or the like. The trihydric nature of the glycerol in such a composition provides the necessary cross-linking to form a three dimensional polymer of the desired type. An analogous type of cross-linking can also be achieved when a combination of a tribasic acid and a glycol is used. In the latter case, the desired three dimensional cross-linking of the polyester results from the polybasicity of the acid. In these compositions, the chemically combined fatty acids act as a drying agent for the liquid polyester product. By varying the amount of oil used, the degree of esterification-polymerization may be varied at will and products of varying properties may be obtained.

The highly important factor of the degree of oil modification which to a large extent determines the properties of the resins can be expressed in terms of "oil-length" which is the proportion of oil to resin. For instance, if the resin contains from about 30 to 40% oil, it is referred to as a "short-oil alkyd," from about 40 to 55%, it is referred to as a "medium-oil alkyd," and when over about 55%, it is referred to as a "long-oil alkyd."

The propionaldoxime anti-skinning agent of the present invention is added to the oxidizable resin, e.g. short-oil alkyd, long-oil alkyd or medium-oil alkyd, and preferably intimately incorporated into the resin, generally in an amount of from about 0.01 to 2.0 percent by weight of the aldoxime based on the resin solids, and preferably in amounts corresponding to from about 0.1 to 1.5 percent by weight of the resin solids. The resins treated against skinning in accordance with the present invention can be pigmented for reinforcing, coloring or hiding purposes. They can also be prepared as clear coating compositions without pigment. Suitable pigments include metal oxides, sulfides, sulfates, carbon black, organic dyestuffs, etc. Other common additives for liquid organic coating compositions can also be used, such as hardeners, softeners, driers, catalysts, and surface active agents.

The following example serves to illustrate the invention but is not to be construed as limiting its scope.

EXAMPLE

Lead and cobalt driers were added to one gallon of each of the following alkyd resins in sufficient amounts to assure skinning of the control sample. Skinning was thus obtained in 1–2 days with all alkyd resins.

The six alkyd resins used were: (1) Plaskon 3175–3, a long oil soya alkyd containing 63% oil and 23% (minimum) phthalic anhydride; (2) Beckosol P–381–70, a long oil linseed alkyd containing 62% oil and 24% (minimum) phthalic anhydride; (3) Duramac 2428, a medium oil soya-linseed alkyd having 54% oil and 30% (minimum) phthalic anhydride; (4) Duramac 2482, a short oil castor type alkyd; (5) Duramac 2776X, a medium oil soya alkyd having 55% oil and 30% (minimum) phthalic anhydride; (6) Duramac 2438, a long oil soya alkyd having 63% oil and 24% (minimum) phthalic anhydride.

125 grams of each drier-containing alkyd was added to each of 13 eight-ounce jars. Propionaldoxime was added immediately in quantities corresponding to 1, 2, 3 and 4 pounds per 100 gallons of resin. After thorough mixing, a small vial was filled and retained for dry time determinations. The eight-ounce jar was covered with aluminum foil and a hole approximately 0.8 cm. in diameter was punched in the foil to accelerate skinning time. The jars were stored on a shelf and degree of skinning was checked periodically for a period of 30 days.

A 1.5 mil. wet film was applied to a Morest Chart and the drying time determined with a Gardner Dry Time Recorder. Due to the large number of samples to be evaluated for dry time the elasped period after mixing varied from 1 to 9 days. After 6 weeks storage of the alkyd resins containing driers and propionaldoxime, dry times were again determined.

The drying time is summarized in Table I, and the skinning time is summarized in Table II. Tables I and II demonstrate that although propionaldoxime substantially increases the skinning time of the resin, the drying time is not deleteriously affected.

TABLE I.—DRYING TIME (HOURS)

| Lbs. propionaldoxime per 100 gal. resin solution | Plaskon 3175-3 | | | | Beckosol P-381-70 | | | | Duramac 2428 | | | |
|---|---|---|---|---|---|---|---|---|---|---|---|---|
| | Wt. percent | STT | TF | DH | Wt. percent | STT | TF | DH | Wt. percent | STT | TF | DH |
| 1 | 0.18 | 1½ | 2 | 4½ | 0.18 | 1½ | 2 | 10 | 0.26 | 1 | 1½ | 11 |
| 2 | 0.36 | 2 | 2½ | 5½ | 0.36 | 1½ | 2 | 11 | 0.52 | 1 | 1½ | 10 |
| 3 | 0.54 | 2½ | 3 | 5 | 0.54 | 1½ | 2 | 11 | 0.78 | 1 | 1½ | 11 |
| 4 | 0.72 | 2½ | 3 | 5 | 0.72 | 1½ | 2 | 9 | 1.04 | 1 | 1½ | 9 |
| Control 0 | 0 | 1½ | 2 | 5½ | 0 | 1½ | 2 | 10 | 0 | 1 | 1½ | 10 |

| Lbs. propionaldoxime per 100 gal. resin solution | Duramac 2482 | | | | Duramac 2776X | | | | Duramac 2428 | | | |
|---|---|---|---|---|---|---|---|---|---|---|---|---|
| | Wt. percent | STT | TF | DH | Wt. percent | STT | TF | DH | Wt. percent | STT | TF | DH |
| 1 | 0.24 | ¼ | ½ | 10 | 0.30 | 1 | 1½ | 7 | 0.18 | 1 | 1½ | 5 |
| 2 | 0.48 | ¼ | ½ | 24 | 0.60 | ½ | 1 | 7 | 0.36 | 1 | 1½ | 5 |
| 3 | 0.72 | ¼ | ½ | 24 | 0.90 | 1 | 2 | 9 | 0.54 | 1½ | 2 | 6 |
| 4 | 0.96 | ¼ | ½ | 24 | 1.20 | ½ | 1 | 9½ | 0.72 | 1½ | 2 | 5 |
| Control 0 | 0 | ¼ | ½ | 10 | 0 | 1 | 1½ | 4½ | 0 | 1 | 1½ | 6 |

STT—set to touch; TF—tack free; DH—dry hard; Wt. percent—weight percent propionaldoxime based on resin solids.

TABLE II.—SKINNING TIME (DAYS)

| Lbs. propionaldoxime per 100 gal. resin solution | Plaskon 3175-3 | | | Beckosol P-381-70 | | | Duramac 2428 | | | Duramac 2482 | | |
|---|---|---|---|---|---|---|---|---|---|---|---|---|
| | Wt. percent | Start | Hard | Wt. percent | Start | Hard | Wt. percent | Start | Hard | Wt. percent | Start | Hard |
| 1 | 0.18 | 4 | 7 | 0.18 | 2 | 4 | 0.26 | 6 | 7 | 0.24 | 22 | 30 |
| 2 | 0.36 | 7 | 15 | 0.36 | 3 | 7 | 0.52 | 14 | 15 | 0.48 | >30 | |
| 3 | 0.54 | 7 | 22 | 0.54 | 7 | 15 | 0.78 | 21 | 22 | 0.72 | >30 | |
| 4 | 0.72 | 7 | 22 | 0.72 | 7 | 17 | 1.04 | 26 | 29 | 0.96 | >30 | |
| Control 0 | 0 | 1 | 2 | 0 | <1 | 1 | 0 | <1 | 1 | 0 | 2 | |

TABLE II.—Continued

| Lbs. propionaldoxime per 100 gal. Resin solution | Duramac 2776X | | | Duramac 2438 | | |
|---|---|---|---|---|---|---|
| | Wt. percent | Start | Hard | Wt. percent | Start | Hard |
| 1 | 0.30 | 11 | 13 | 0.18 | 4 | 6 |
| 2 | 0.60 | 18 | 22 | 0.36 | 13 | 18 |
| 3 | 0.90 | 24 | 25 | 0.54 | 18 | 25 |
| 4 | 1.20 | 29 | 30 | 0.72 | 25 | 28 |
| Control 0 | 0 | 1 | 2 | 0 | 1 | 2 |

It is claimed:

1. A composition of matter, the essential constituents of which are a resin which dries by oxidation and propionaldoxime in an amount effective to prevent skinning of said resin.

2. The composition of claim 1 wherein said amount is from about 0.01 to 2.0 percent by weight of the resin solids.

3. The composition of claim 1 wherein said resin is an alkyd resin modified with an unsaturated fatty acid having at least about 10 carbon atoms.

4. A process for preventing skinning of a resin which dries by oxidation during storage which comprises incorporating into said resin an amount of propionaldoxime effective to prevent said skinning.

5. The process of claim 4 wherein said amount is from 0.01 to 2.0 percent by weight of the resin solids.

6. The process of claim 4 wherein said resin is an oil modified alkyd resin modified with an unsaturated fatty acid having at least about 10 carbon atoms.

References Cited

FOREIGN PATENTS 848,826  9/1960  Great Britain.
954,179  4/1964  Great Britain.

OTHER REFERENCES

Chem. Abstracts, vol. 54, No. 18, Sept. 25, 1960, p. 18342 and 1834c, Cason et al.

Chem. Abstracts, vol. 54, No. 21, Nov. 10, 1960, p. 23368b, Meckbach.

Chem. Abstracts, vol. 55, No. 7, Apr. 3, 1961, p. 6885i, Meckbach.

Chem. Abstracts, vol. 60, No. 5, Mar. 2, 1964, p. 5750c, Bogatyrev et al.

Chem. Abstracts, vol. 61, No. 10, Nov. 9, 1964, p. 12199f, Giesen.

DONALD E. CZAJA, Primary Examiner

R. W. GRIFFIN, Assistant Examiner

U.S. Cl. X.R.

260—40, 75